US008861574B2

(12) United States Patent
Lai et al.

(10) Patent No.: US 8,861,574 B2
(45) Date of Patent: Oct. 14, 2014

(54) SYSTEM AND METHOD FOR PROVIDING A WIRELESS/POWER-LINE DIVERSITY COMMUNICATIONS CHANNEL

(75) Inventors: Stephen William Lai, Calgary (CA); Geoffrey G. Messier, Calgary (CA)

(73) Assignee: Telecommunications Research Laboratories, Edmonton, Alberta (CA)

( * ) Notice: Subject to any disclaimer, the term of this patent is extended or adjusted under 35 U.S.C. 154(b) by 10 days.

(21) Appl. No.: 13/698,120

(22) PCT Filed: May 20, 2011

(86) PCT No.: PCT/CA2011/000592
§ 371 (c)(1),
(2), (4) Date: Dec. 5, 2012

(87) PCT Pub. No.: WO2011/143763
PCT Pub. Date: Nov. 24, 2011

(65) Prior Publication Data
US 2013/0070821 A1 Mar. 21, 2013

Related U.S. Application Data
(60) Provisional application No. 61/347,004, filed on May 21, 2010.

(51) Int. Cl.
*H04L 5/16* (2006.01)
*H04L 27/00* (2006.01)
*H04B 7/08* (2006.01)
*H04B 1/38* (2006.01)
*H04B 7/06* (2006.01)
*H04B 3/54* (2006.01)

(52) U.S. Cl.
CPC ............... *H04B 7/06* (2013.01); *H04B 7/0848* (2013.01); *H04B 1/38* (2013.01); *H04B 7/08* (2013.01); *H04B 7/0854* (2013.01); *H04B 3/542* (2013.01)
USPC .......................................... 375/219; 375/259

(58) Field of Classification Search
USPC ........... 375/219, 259, 295; 330/149; 455/108, 455/114.3
See application file for complete search history.

(56) References Cited

U.S. PATENT DOCUMENTS 5,493,695 A    2/1996  Aitkenhead et al.
6,185,258 B1   2/2001  Alamouti et al.
(Continued)

OTHER PUBLICATIONS

International Search Report and Written Opinion of the International Searching Authority, issued in International Application No. PCT/CA2011/000592, dated Aug. 17, 2011, 9 pages, in its entirety.

(Continued)

*Primary Examiner* — Khai Tran
(74) *Attorney, Agent, or Firm* — J. Jay Haugen; Dentons Canada LLP

(57) ABSTRACT

A system and method is presented where a low-IF architecture can be used to allow existing wireless standards to be used for joint wireless/power-line channel transmission in the provision of diversity communications channels. Diversity combining of wireless and power-line channels can be employed, wherein the input noise to the maximum-likelihood detector can be Class A-distributed. For uncoded BPSK, the BER can be a function of PLC impulsiveness and can improve wireless-only BER by orders of magnitude when PLC SNR >10 dB. The error performance can be equivalent to BER of the static PLC channel for low wireless SNR and can improve with a slope of −1 at high wireless SNRs. The inflection point between these two regions can occur at approximately 0 dB when PLC noise is Gaussian, and increases above 20 dB as the noise becomes more impulsive.

15 Claims, 7 Drawing Sheets

(56) References Cited

U.S. PATENT DOCUMENTS

| | | | | |
|---|---|---|---|---|
| 2002/0006171 | A1* | 1/2002 | Nielsen | 375/316 |
| 2007/0047672 | A1* | 3/2007 | Kim | 375/329 |
| 2007/0232246 | A1* | 10/2007 | Lozhkin et al. | 455/108 |
| 2008/0170540 | A1 | 7/2008 | Fukuda | |

OTHER PUBLICATIONS

Kay, Steven M.; Fundamentals of Statistical Signal Processing, vol. II Detection Theory; 1998; Prentice-Hall PTR, Upper Saddle River, USA; in its entirety.

Proakis, John G.; Digital Communications, Fourth Edition; International Edition 2001; Irwin/McGraw-Hill, New York, USA; in its entirety.

Brennan, D. G.; Linear Diversity Combining Techniques; Proceedings of the IEEE, vol. 91, No. 2, Feb. 2003, pp. 331-356.

Cañete, F. J., et al.; Fundamentals of the Cyclic Short-Time Variation of Indoor Power-line Channels; 2005 IEEE International Symposium on Power Line Communication and its Applications, pp. 157-161, 2005.

Chan, M. H. L., et al.; Attenuation of Communication Signals on Residential and Commercial Intrabuilding Power-Distribution Circuits; IEEE Transactions on Electromagnetic Compatibility, vol. EMC-28, No. 4, pp. 220-230, Nov. 1986.

Corripio, F. J. C., et al.; Analysis of the Cyclic Short-Term Variation of Indoor Power Line Channels; IEEE Journal on Selected Areas in Communications, vol. 24, No. 7, pp. 1327-1338, Jul. 2006.

Giovaneli, C. L., et al.; Optimum Space-Diversity Receiver for Class A Noise Channels; IEEE International Symposium on Power Line Communication and its Applications, 2004, 6 pages, in its entirety.

Götz, M., et al.; Power Line Channel Characteristics and Their Effect on Communication System Design; IEEE Communications Magazine, Apr. 2004, pp. 78-86.

H•Ring, J., et al.; Coding for Impulsive Noise Channels; IEEE International Symposium on Power Line Communications, Feb. 18, 2001, pp. 103-108.

Liu, E., et al.; Broadband Powerline Channel and Capacity Analysis; 2005 IEEE International Symposium on Power Line Communication and its Applications, pp. 7-11, 2005.

Middleton, D.; Non-Gaussian Noise Models in Signal Processing for Telecommunications: New Methods and Results for Class A and Class B Noise Models; IEEE Transactions on Information Theory, vol. 45, No. 4, May 1999, pp. 1129-1149.

Middleton, D.; Statistical-Physical Models of Electromagnetic Interference; IEEE Transactions on Electromagnetic Compatibility, vol. EMC-19, No. 3, Aug. 1977, pp. 106-127.

Katar, S., et al.; Harnessing the potential of powerline communications using the HomePlug AV standard; RF Design, Aug. 2006, pp. 16-26.

Zimmermann, M., et al.; A Multipath Model for the Powerline Channel; IEEE Transactions on Communications, vol. 50, No. 4, Apr. 2002, pp. 553-559.

Zimmermann, M., et al.; Analysis and Modeling of Impulsive Noise in Broad-Band Powerline Communications; IEEE Transactions on Electromagnetic Compatibility, vol. 44, No. 1, Feb. 2002, pp. 249-258.

Fertonani, D., et al.; A Robust Metric for Soft-Output Detection in the Presence of Class-A Noise; IEEE Transactions on Communications, vol. 57, No. 1, Jan. 2009, pp. 36-40.

Andreadou, N., et al.; Modeling the Noise on the OFDM Power-Line Communications System; IEEE Transactions on Power Delivery, vol. 25, No. 1, Jan. 2010, pp. 150-157.

H•Ring, J., et al.; Performance Bounds for Optimum and Suboptimum Reception Under Class-A Impulsive Noise; IEEE Transactions on Communications, vol. 50, No. 7, Jul. 2002, pp. 1130-1136.

Hashmat, R., et al.; MIMO Communications for Inhome PLC Networks: Measurements and Results up to 100 MHz; 2010 IEEE International Symposium on Power Line Communications and Its Applications, pp. 120-124, 2010.

Hollemans, W., et al.; Performance analysis of cellular digital mobile radio systems including diversity techniques; The 8th IEEE International Symposium on Personal, Indoor and Mobile Radio Communications, 1997, pp. 266-270, vol. 2.

Lai, S. W., et al.; The Wireless/Power-line Diversity Channel; 2010 IEEE International Conference on Communications, 2010, 5 pages in its entirety.

Nakagawa, H., et al.; A Decoding for Low Density Parity Check Codes over Impulsive Noise Channels; 2005 International Symposium on Power Line Communications and Its Applications, 2005, pp. 85-89.

Schober, R., et al.; Diversity Combining for Coherent and Differential M-PSK in Fading and Class-A Impulsive Noise; IEEE Transactions on Wireless Communications, vol. 4, No. 4, Jul. 2005, pp. 1425-1432.

Spaulding, A. D., et al.; Optimum Reception in an Impulsive Interference Environment—Part 1: Coherent Detection; IEEE Transactions on Communications, vol. COM-25, No. 9, Sep. 1977, pp. 910-923.

Tepedelenlioglu, C., et al.; On Diversity Reception Over Fading Channels with Impulsive Noise; IEEE Transactions on Vehicular Technology, vol. 54, No. 6, Nov. 2005, pp. 2037-2047.

Digital Video Broadcasting (DVB); Second generation framing structure, channel coding and modulation systems for Broadcasting, Interactive Services, News Gathering and other broadband satellite applications (DVB-S2); ETSI EN 302307, v1.2.1, Aug. 2009, European Telecommunications Standards Institute, 2009, 78 pages in its entirety.

* cited by examiner

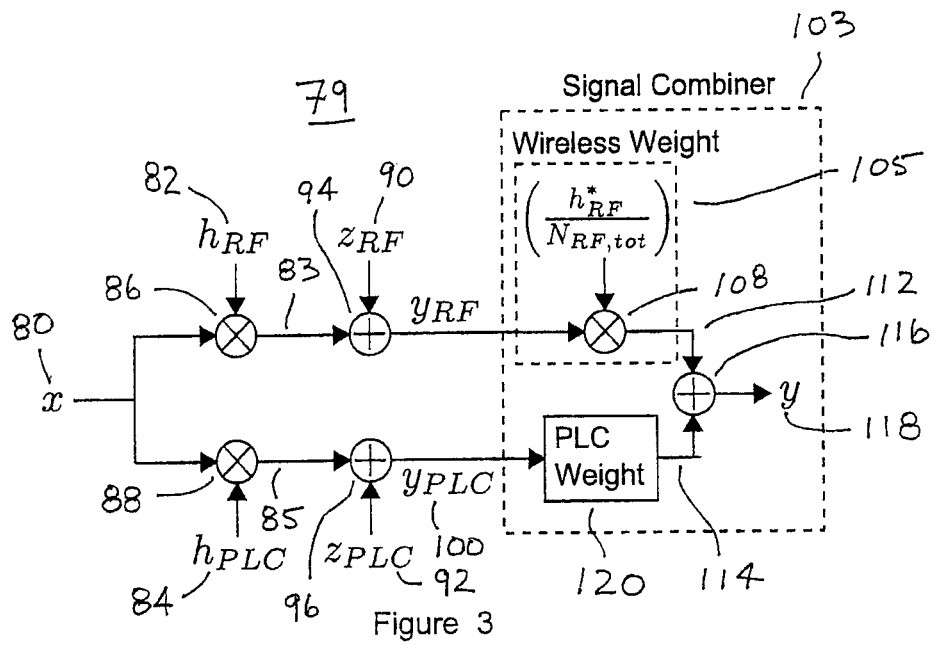
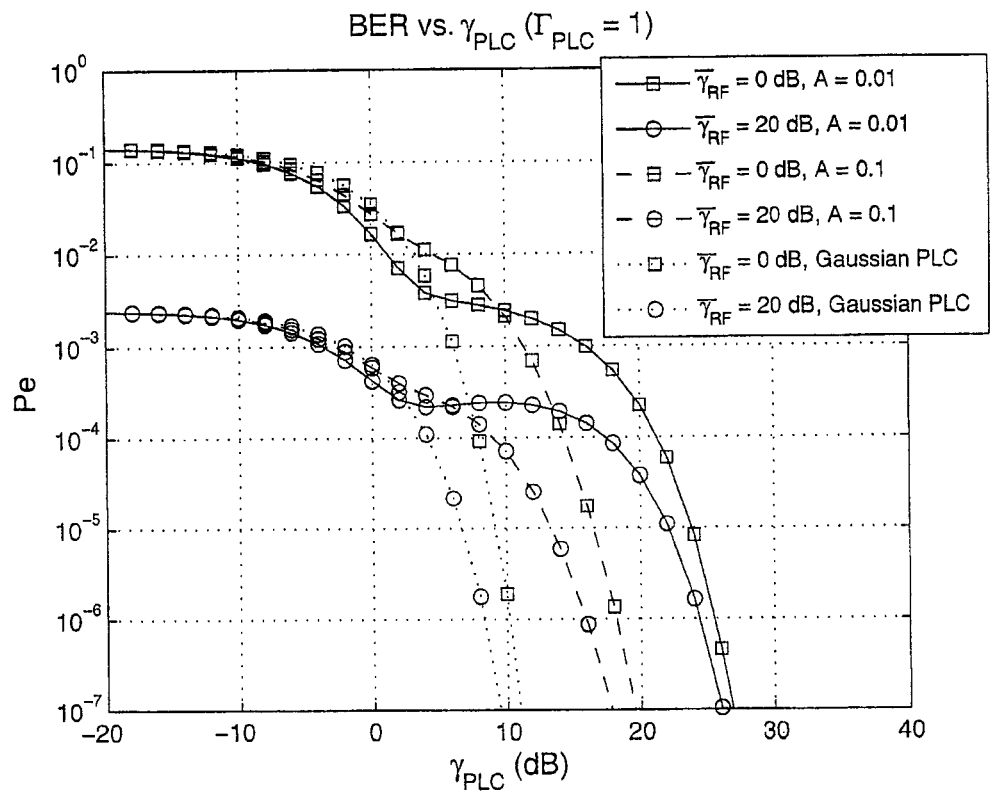
FIG. 4

SYSTEM AND METHOD FOR PROVIDING A WIRELESS/POWER-LINE DIVERSITY COMMUNICATIONS CHANNEL

CROSS-REFERENCE TO RELATED APPLICATIONS

This application is the United States national phase filing under 35 U.S.C. 371 of the corresponding international application number PCT/CA2011/000592, filed May 20, 2011, which claims priority to and benefit of U.S. provisional patent application Ser. No. 61/347,004 filed May 21, 2010, which applications are hereby incorporated by reference herein in the entirety.

TECHNICAL FIELD

The present disclosure is related to the field of providing diversity communications channels to wireless computer network, in particular, using the power-line infrastructure in a building as a communications medium for a diversity communications channel for computing devices wirelessly connected to the wireless network.

BACKGROUND

Wireless technology within the home has become increasingly prevalent due to the ease of connectivity offered by mature standards such as WiFi, Bluetooth, and Zigbee. Although the radio channel enables untethered communication, in-home wireless devices, such as laptop computers, speakers, etc., are often found connected to wall power outlets to provide a stable source of energy for extended periods of time.

The emergence of smart home technology promises an increasing number of devices that may be connected to the wireless network. However, many intelligent appliances and sensors, such as energy consumption monitors and multimedia devices, will be non-mobile and will require connection to the household alternating current ("AC") power distribution network for practical implementation.

This observation can be used to improve the physical layer performance of future in-home wireless networks by using the readily-accessible power distribution network as an additional multiple-access channel. Current standards for broadband power-line communication ("PLC") are quite similar to wireless standards at the physical layer with both employing orthogonal frequency division multiplexing ("OFDM") to achieve high data transfer rates through wideband frequency-selective fading channels without requiring complex equalization filters [11]. This suggests that a wireless signal could also be transmitted over the PLC channel (or a PLC signal could be transmitted over the wireless channel) with very little modification.

It is, therefore, desirable to provide a system and method for providing a diversity communications channel over a power-line communications channel to support computing devices connected to a wireless communications network.

SUMMARY

A system and method for providing a wireless/power-line diversity communications channel is presented herein. In one embodiment, a new communications architecture is provided that can simultaneously transmit the same OFDM signal over both a wireless and a PLC channel. This architecture can improve physical layer performance by performing diversity combining on the PLC and wireless signals at a receiver. In another embodiment, an analytical expression for the bit error rate ("BER") of this system that accounts for Rayleigh fading on the wireless link and impulsive noise on the PLC link can be provided.

In some embodiments, a computing device is provided that can comprise the systems and methods described herein. The computing device can comprise one or more of the group consisting of personal computers, laptop computers, notebook computers, computer servers, computer routers, computer modems, digital television set-top boxes, personal digital assistants, wireless telephones, cellular telephones, smart phones and any other computing device that can communicate over a wireless communications network as well known to those skilled in the art.

Broadly stated, in some embodiments, a system is provided for providing a diversity communications channel to a wireless communications network, comprising: an input data modulator for receiving a data input signal and transforming the input signal to at least one input data stream; at least one digital to analogue converter ("DAC") operatively coupled to the input data modulator, wherein the at least one DAC is configured to convert the at least one input data stream into at least one analogue signal; a radio frequency ("RF") upconverter operatively coupled to the at least one DAC, wherein the RF upconverter is configured to modulate an RF carrier signal with the at least one analogue signal; and an intermediate frequency ("IF") modulator operatively coupled to the at least one DAC, wherein the IF modulator is configured to modulate an IF carrier signal with the at least one analogue signal.

Broadly stated, in some embodiments, a method is provided for providing a diversity communications channel to a wireless communications network, the method comprising the steps of: transforming a data input signal into at least one input data stream; converting the at least one input data stream into at least one analogue signal; modulating the at least one analogue signal onto a radio frequency ("RF") carrier signal; and modulating the at least one analogue signal onto an intermediate frequency ("IF") carrier signal.

Broadly stated, in some embodiments, a computing device configured for transmitting data over a wireless communications network is provided, the computing device comprising a system for providing a diversity communications channel over the wireless communications network, the system comprising: an input data modulator for receiving a data input signal and transforming the input signal to at least one input data stream; at least one digital to analogue converter ("DAC") operatively coupled to the input data modulator, wherein the at least one DAC is configured to convert the at least one input data stream into at least one analogue signal; a radio frequency ("RF") upconverter operatively coupled to the at least one DAC, wherein the RF upconverter is configured to modulate an RF carrier signal with the at least one analogue signal; and an intermediate frequency ("IF") modulator operatively coupled to the at least one DAC, wherein the IF modulator is configured to modulate an IF carrier signal with the at least one analogue signal.

Incorporated by reference into this application in its entirety is a paper written by the inventors entitled, "The Wireless/Power-line Diversity Channel", presented at the IEEE international Conference on Communications ("ICC") Conference in Cape Town, South Africa on May 25, 2010.

BRIEF DESCRIPTION OF THE DRAWINGS

FIG. 3 is a block diagram depicting a signal model for each subcarrier in an OFDM waveform using a generalized combining technique.

FIG. 4 is an X-Y chart depicting the bit error rate of a BPSK subcarrier versus the PCL signal to noise ratio for MRC.

DETAILED DESCRIPTION OF EMBODIMENTS

System Architecture

Figure 1:
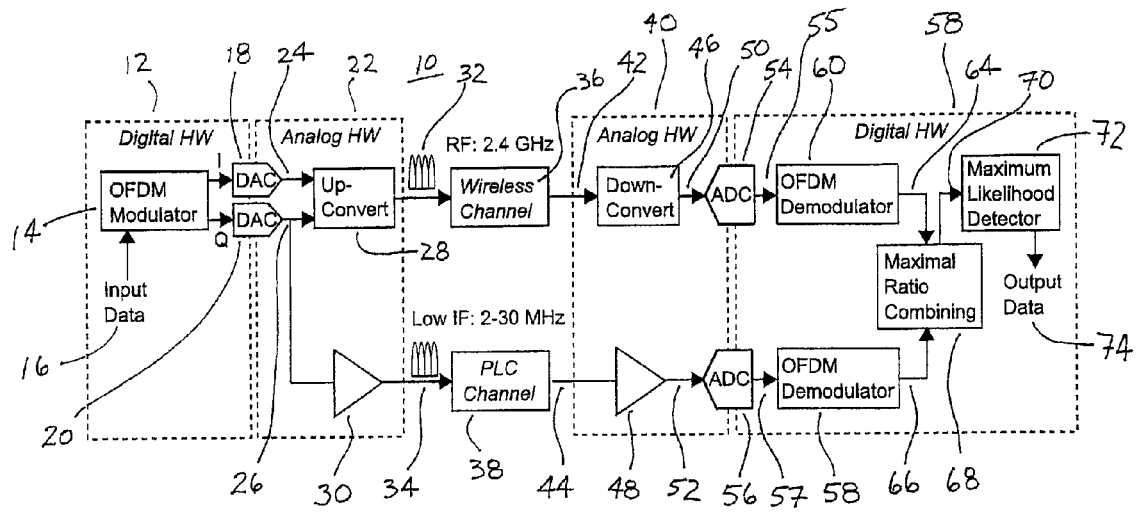
FIG. 1 is a block diagram depicting a wireless communications network with power-line channel diversity.

One embodiment for an architecture for a wireless system with PLC diversity is shown in FIG. 1. In the transmitter, a standard wireless chipset can be used to perform the baseband operations required for coding and OFDM modulation of the source data. The analog portion of the transmitter can employ a low intermediate frequency ("IF") architecture instead of the typical direct-to-radio frequency ("RF") architecture. This can allow a coupled version of the IF signal to be further amplified and transmitted on a PLC channel.

This means that two identical copies of the OFDM signal can be transmitted on the wireless and PLC channels. Wireless transmission can occur on LAN-based spectrum such as 2.4 GHz, while PLC transmission can occur in the 2-30 MHz range.

In the receiver, the wireless and PLC signals can be downconverted using separate RF chains in the analog hardware. Analog-to-Digital Converters ("ADCs") can be used to sample the signals and two independent (but identical) OFDM digital demodulators can be used to extract the individual subcarriers. Maximal ratio combining ("MRC"), via a signal combiner, can be used in conjunction with a maximum likelihood detector to perform detection of subcarrier symbols and retrieve the original source data.

From a channel capacity perspective, it is important to note that this scheme can use a PLC for diversity gain rather than multiplexing gain due to significant implementation advantages shown in FIG. 1. This low-IF architecture can allow the diversity channel to be utilized with minimal additional hardware and, most importantly, no change to the wireless standard.

Referring to FIG. 1, in some embodiments, system 10 can comprise digital transmit hardware module 12 further comprising OFDM modulator 14 that can receive input data 16. OFDM modulator 14 can produce digital "I" and "Q" signals that feed into DACs 18 and 20, respectively. DACs 18 and 20 can produce analog I and Q signals 24 and 26 that feed into analog transmit hardware module 22 as inputs to RF upconverter 28 to produce RF signal 32 that can be transmitted as wireless RF signal 42 on wireless channel 36, as well known to those skilled in the art. In some embodiments, wireless channel 36 can comprise an RF carrier frequency in the 2.4 GHz region. Analog Q signal 26 can also feed into IF upconverter 30 to produce PLC IF signal 34, that can be transmitted as PLC IF signal 44 on PLC channel 38, as well known to those skilled in the art.

As RF signal 42 and PLC IF signal 44 travel through wireless channel 36 and PLC channel 38, they can be received by RF downconverter 46 and IF downconverter 48, respectively, which can be disposed in analog receive hardware module 40. RF downconverter 46 can convert RF signal 42 into wireless receive signal 50 that can feed into analog-to-digital ("ADC") 54 to produce wireless receive signal 55. IF downconverter 48 can convert PLC IF signal 44 into PLC receive signal 52 that can feed into ADC 56 to produce PLC receive signal 57. Receive signals 55 and 57 can then feed into OFDM demodulators 60 and 62, respectively, which can be disposed in digital receive hardware module 58. OFDM demodulators 60 and 62 can demodulate wireless digital signal 64 and PLC digital signal 66 from receive signals 55 and 57, respectively. Digital signals 64 and 66 can then be combined at combiner 68 to produce combined output signal 70. Combined output signal 70 can then be processed by maximum likelihood detector 72 to produce output data signal 74.

The modularity inherent in this architecture can allow a transmitter/receiver pair to be configured in one of three transmission modes. Depending on quality of the two independent channels, transceivers could dynamically select between wireless-only, PLC-only, or simultaneous (ie. hybrid) wireless/PLC transmission. As set out below, a method is presented for calculating the inflection point on the BER curve for simultaneous wireless/PLC transmission will be presented that will guide a network operator as to which mode of operation provides the best performance.

System Model

In one embodiment, a signal model can be developed for each subcarrier within the OFDM waveform. In another embodiment, a model is presented for both the wireless and PLC channels. In further embodiments, maximal ratio combining ("MRC") can be used to combine the wireless and PLC signals. Subcarrier bandwidth can be assumed to be sufficiently small such that wireless and PLC channel transfer functions can be modeled with complex multipliers, as shown in FIG. 2.

Figure 2:
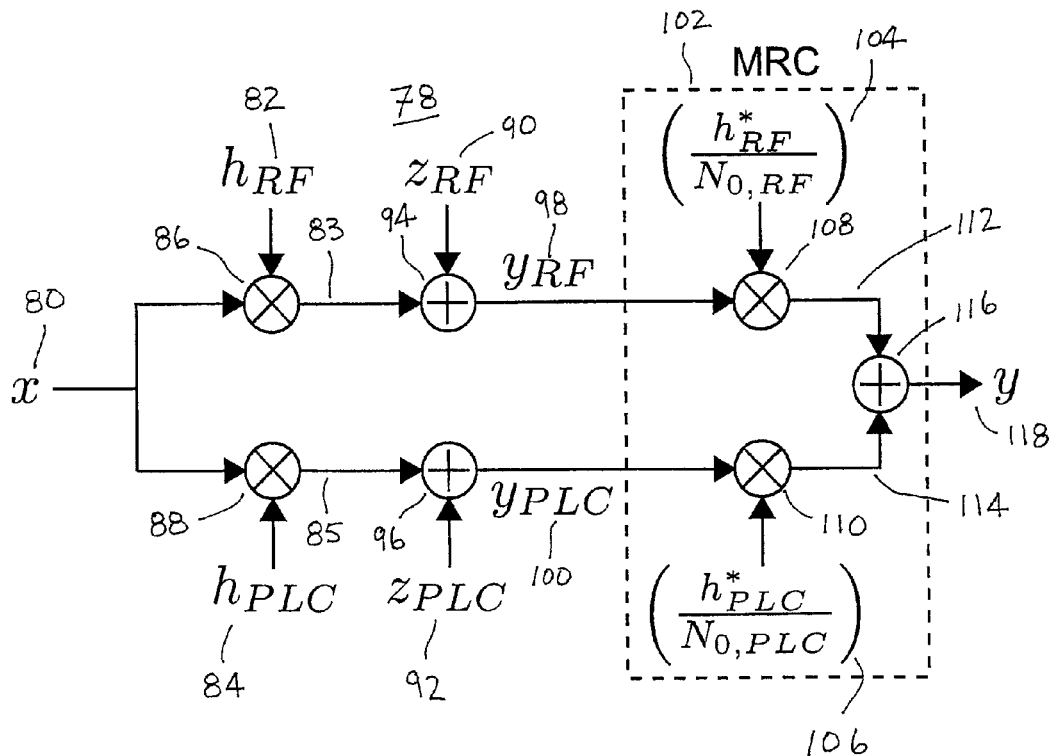
FIG. 2 is a block diagram depicting a signal model for each subcarrier in an OFDM waveform using the Maximal Ratio Combining (MRC) technique.

Referring to FIG. 2, one embodiment of signal model 78 is shown. In this embodiment, signal model 78 can comprise input data signal 80 being multiplied with RF channel coefficient 82 at multiplier 86 to produce RF signal 85, and input data signal 80 being multiplied with PLC channel coefficient 84 at multiplier 88 to produce IF signal 87. RF signal 83 can be combined with RF noise coefficient 90 at combiner 94 to produce RF output signal 98. IF signal 85 can be combined with PLC noise coefficient 92 at combiner 96 to produce PLC output signal 100, each of which can be input signals to MRC model 102, where RF output signal 98 can be multiplied with wireless channel coefficient 104 at multiplier 108 to produce wireless data signal 112, and where PLC output signal 100 can be multiplied with PLC channel coefficient 106 at multiplier 110 to produce PLC data signal 114. Data signals 112 and 114 can then be combined at combiner 116 to produce combined output data signal 118.

In some embodiments, the signal combiner can be used to combine the outputs from the wireless and PLC channels into a single signal that can then be processed by a maximum likelihood detector. An embodiment of signal model 79 for the wireless and PLC channels, and a signal combiner is shown in FIG. 3. In this embodiment, signal model 79 differs from signal model 78 in that, within signal combiner 103, RF output signal 98 can be multiplied with wireless channel weighting coefficient 105 at multiplier 108 to produce wireless data signal 112, and that PLC output signal 100 can be multiplied with PLC channel weighting coefficient 120 to produce PLC data signal 114. Data signals 112 and 114 can then be combined at combiner 116 to produce combined output data signal 118.

In some embodiments, signal combiner 103 can provide a weight for each of the wireless and PLC channels. For the wireless channel, the optimum weight can be obtained by multiplying the wireless output with the complex-conjugate of the wireless channel gain and dividing by the wireless noise variance. For the PLC channel, a variety of weighting techniques can be used. The weights from wireless and PLC channels can then be combined and sent to the maximum likelihood detector.

Wireless and PLC Channels

The outputs from the wireless and PLC channels can be given by:

$$y_{RF} = h_{RF} x + z_{RF} \quad (1)$$

$$y_{PLC} = h_{PLC} x + z_{PLC} \quad (2)$$

where x is the common input symbol, $h_{RF}$ and $h_{PLC}$ are complex channel coefficients, and $z_{RF}$ and $z_{PLC}$ are complex random variables representing noise and interference. It should be noted that $h_{RF}$ and $h_{PLC}$ can represent aggregate gain within each transmitter plus channel path. Therefore, any gain imbalances in hardware can be represented by their relative magnitudes.

Although both channels can experience attenuation due to multipath propagation, the fading rates are different due to the physical nature of the channels. In one embodiment, we can assume non-line of sight ("LOS") transmission for the indoor wireless channel, and can model $h_{RF}$ as a Rayleigh-distributed flat-fading parameter such that $h_{RF} \sim CN(0, \sigma_f^2)$, where $\sigma_f^2 = E\{|h_{RF}|^2\}$. Wireless fading can be caused by the constructive/destructive addition of multipath signals and can fluctuate as the receiver, transmitter or other objects in the environment move distances equal to a fraction of the signal wavelength.

In contrast, the PLC channel can comprise much more static. Fading in the PLC channel can stem from the branch-based topology of the mains network and signal reflections that occur at discontinuities such as cable joints and end terminals [3, 12]. Fluctuations in PLC attenuation, due to appliance insertion and removal, can occur at a much slower rate.

In some embodiments, the analytical BER derivation can model $h_{PLC}$ as a static parameter and only average over the statistical fluctuations in $h_{RF}$ when determining an average value for BER. The specific value of $h_{PLC}$ can be calculated with one of several readily available models for PLC attenuation [12].

In some embodiments, the noise in the wireless channel, $z_{RF}$, can be assumed to be dominated by thermal performance of the receiver and can be modeled as a circularly symmetric complex Gaussian random variable, $z_{RF} \sim CN(0, N_{0,RF})$, with real and imaginary components having variance of $N_{0,RF}/2$.

In some embodiments, the noise in the PLC channel can be generally more complicated and has been the subject of several studies [2, 4, 13]. In these investigations, $z_{PLC}$ was found be comprised of a combination of colored noise, narrowband noise, synchronous impulse noise, and asynchronous impulse noise. Studies on the cyclostationary nature of PLC noise have shown varying degrees of non-stationarity depending on measurement frequency and dwelling type. Plots of instantaneous noise spectrum versus time in [2] indicate that, in office environments, many frequencies within the 1-20 MHz band contain negligible amounts of cyclostationarity, and results from [4] show that residential households contain less variation than apartments or offices.

To maintain analytical tractability and obtain general conclusions about hybrid wireless/PLC transmission, a general impulsive noise model for $z_{PLC}$ can be used. In some embodiments, the well-known Middleton Class A noise model can be used to provide reasonable predictions of system performance.

The Class A model can combine Gaussian and impulsive noise and can be characterized by a probability distribution function ("PDF"), which is a sum of weighted normal distributions such that [9, 10]:

$$p(z_r) = \sum_{m=0}^{\infty} \frac{e^{-A} A^m}{m!} \frac{1}{\sqrt{2\pi\sigma_m^2}} \exp\left(-\frac{z_r^2}{2\sigma_m^2}\right) \quad (3)$$

where $z = \text{Re}[z_{PLC}]$ and the imaginary component is independent identically distributed. The variance, $\sigma_m^2$, can be defined as:

$$\sigma_m^2 = \sigma_{PLC}^2 \frac{m/A + \Gamma_{PLC}}{1 + \Gamma_{PLC}} \quad (4)$$

$$= \frac{m}{A} \sigma_I^2 + \sigma_G^2 \quad (5)$$

where $\sigma_{PLC}^2 = \sigma_G^2 + \sigma_I^2$ and $\Gamma_{PLC} = \sigma_G^2/\sigma_I^2$ is the ratio of the additive Gaussian ($\sigma_G^2$) and impulsive ($\sigma_I^2$) noise components in $z_r$. The total noise power density in the complex PLC channel is given by $N_{0,PLC} = 2\sigma_{PLC}^2$.

In some embodiments, the impulsive index, A, can be the product of the average number of impulses in a second and the average duration of each impulse, and can represent the duty-cycle of impulses in the time-domain. Smaller A's can result in impulsive behavior characterized by short-duration, high-amplitude excursions, whereas with larger A's, the Class A noise can be more continuous and Gaussian-like. Studies have shown that A can generally range between 0.001 to 0.35 for different PLC environments [6, 8, 10].

A frequency flat channel can be assumed for the a branch diversity system as described herein. This assumption includes subcarrier channels within an orthogonal frequency-division multiplexed ("OFDM") signal or low symbol-rate systems where the channel response is approximately flat over the signal bandwidth [24]. Assuming ideal synchronization and no intersymbol interference, the output of each channel can be $$y_c = h_c x + z_c \quad (5.1)$$

where $c \in \{1, 2\}$ is the diversity channel number, x is the input modulation symbol and $z_c$ is a complex noise random variable. The channel coefficient, $h_c$, represents the complex gain of each channel and may be either static or randomly varying over time. It can be assumed that $z_1$ and $z_2$ represent non-identical, independent Class-A noise processes.

In some embodiments, the Middleton Class-A model can be adopted, which can assign the complex valued noise, $z_c$, with a probability density function (pdf)

$$p(z_c) = \sum_{m_c=0}^{\infty} \alpha_{m_c} p(z_c|m_c) \tag{5.2}$$

where $$\alpha_{m_c} = \frac{e^{-A_c} A_c^{m_c}}{m_c!} \tag{5.3}$$

$$p(z_c|m_c) = \frac{1}{\pi N_{m_c}} \exp\left(\frac{-|z_c|^2}{N_{m_c}}\right) \tag{5.4}$$

The impulsive index $A_c$, can be the product of the average number of impulses per second and the average duration of each impulse. The parameter, $N_{m_c}$, represents the state-specific noise variance and is discussed further below.

Similar to previous works [17, 25, 27], the Class-A model can be interpreted as a noise process with a 'conditionally-Gaussian' distribution. Noise samples are assumed i.i.d. and each time sample is characterized by a random noise state, $m_c$. The noise state can be selected from the set $m_c \in \{0, 1, \ldots, \infty\}$ and can be Poisson-distributed such that the probability of being in a given state is equivalent to (5.3). Each noise sample can be Gaussian-distributed according to (5.4) with variance determined by the noise state. With this interpretation, it can be seen that the Class-A pdf in (5.2) can be simply the sum of all conditional-Gaussian pdf's multiplied with the occurrence probabilities of the associated states.

The state-specific noise variance can be given by $N_{m_c} = \beta_{m_c} N_{c,tot}$ where $\beta_{m_c} = (m_c/A_c + \Gamma_c)/(1+\Gamma_c)$ and $N_{c,tot}$ is the total variance of the Class-A noise. The parameter, $\Gamma_c$, is the ratio of Gaussian-to-impulsive noise and tends to infinity when $z_c$ is completely AWGN. When $\Gamma_c$ is non-zero, the state $m_c=0$ can correspond to the Gaussian noise component.

The SNR of each channel can be $\gamma_c = E[|y_c|]^2/N_{c,tot}$ where $E[\cdot]$ can denote the expectation operator and is taken over all possible symbol values for x.

Diversity Combining

Assuming MRC is used in the receiver, the received symbol can be written as:

$$y = \left(\frac{h_{RF}^*}{N_{0,RF}}\right) y_{RF} + \left(\frac{h_{PLC}^*}{N_{0,PLC}}\right) y_{PLC} \tag{6}$$

where $N_{0,RF}$ and $N_{0,PLC}$ represent the noise power densities in the wireless and PLC paths, respectively. In (6), maximal-ratio combining can be performed by multiplying each channel output with the complex-conjugate of the channel gain and inverse of the channel noise power [1].

Substituting (1) and (2) into (6) and taking the real part results in:

$$y_r = \left(\frac{|h_{RF}|^2}{N_{0,RF}} + \frac{|h_{PLC}|^2}{N_{0,PLC}}\right) x_r + n_r \tag{7}$$

where $y_r$ and $x_r$ denote the real parts of y and x, respectively, and $$n_r = \frac{\text{Re}[h_{RF}^* z_{RF}]}{N_{0,RF}} + \frac{\text{Re}[h_{PLC}^* z_{PLC}]}{N_{0,PLC}} \tag{8}$$

represents the noise of $y_r$.

The first term in (8) is Gaussian-distributed while the second term is Class A-distributed according to (3) such that it represents both the Gaussian and impulsive noise components on the PLC channel.

The variance of $n_r$ can be given by:

$$\sigma_{nr}^2 = \frac{|h_{RF}|^2 N_{0,RF}/2}{(N_{0,RF})^2} + \frac{|h_{PLC}|^2 N_{0,PLC}/2}{(N_{0,PLC})^2} \tag{9}$$

$$= \frac{1}{2}\left[\frac{|h_{RF}|^2}{N_{0,RF}} + \frac{|h_{PLC}|^2 N_{0,PLC,G}}{(N_{0,PLC})^2} + \frac{|h_{PLC}|^2 N_{0,PLC,I}}{(N_{0,PLC})^2}\right] \tag{10}$$

where the circularly symmetric properties of $z_{RF}$ and $z_{PLC}$ have been used to obtain (9). In (10), the PLC noise has been separated into Gaussian ($N_{0,PLC,G} \approx 2\sigma_G^2$) and impulsive ($N_{0,PLC,I} = 2\sigma_I^2$) components. We can readily see that $n_r$ can be, itself, a Class A random noise process with Gaussian and impulsive variances given by:

$$\sigma_{nrG}^2 = \frac{1}{2}\left[\frac{|h_{RF}|^2}{N_{0,RF}} + \frac{|h_{PLC}|^2 N_{0,PLC,G}}{(N_{0,PLC})^2}\right] \tag{11}$$

$$\sigma_{nrI}^2 = \frac{1}{2}\left[\frac{|h_{PLC}|^2 N_{0,PLC,I}}{(N_{0,PLC})^2}\right] \tag{12}$$

and $\sigma_{nr}^2 = \sigma_{nrG}^2 + \sigma_{nrI}^2$.

PLC Weighting

In some embodiments, the PLC channel output can be processed using a PLC weight block. A variety of algorithms can be used for PLC weighting based on optimum and suboptimum combining schemes. These combining schemes can include:

Optimum Combining—State Known (OCSK)
Optimum Combining—State Unknown (OCSU)
Suboptimum Combining (SC)
Maximal Ratio Combining (MRC)

The theoretical basis of these schemes is described in the following sub-sections.

Optimum Combining

The optimum combiner can perform maximum-likelihood ("ML") detection by selecting the symbol value of x which maximizes the log-likelihood function $$LL(\tilde{x}) \ln [p(y_1|\tilde{x}) \cdot p(y_2|\tilde{x})] \tag{12.1}$$

where $\tilde{x}$ is the trial value for x and $p(y_c|\tilde{x})$ is the pdf of output $y_c$ conditioned on $\tilde{x}$ where $c \in \{1,2\}$. The logarithmic argument above is simply the joint probability of $y_1$ and $y_2$ for the case of independent Class-A channels.

Using $LL(\tilde{x})$, two combining methods can be determined. Optimum combining—state known (OCSK) is where $p(y_1|\tilde{x})$ and $p(y_2|\tilde{x})$ can be viewed as conditionally-Gaussian distributions where the optimum receiver is aware of the Class-A noise states ($m_c$ for c=1,2) at each time instant. Optimal combining—state unknown (OCSU) is where the receiver is not aware of the noise states but has perfect knowledge of the noise pdf.

For OCSK, the LL can be modified to account for the receiver's additional knowledge about the noise states, ie.

$$LL(\tilde{x}) = \ln [p(y_1|\tilde{x},m_1) \cdot p(y_2|\tilde{x},m_2)]. \quad (12.2)$$

Since the noise is additive, we can write $p(y_c|\tilde{x},m_c)=p(z_c=y_c-h_c\tilde{x}|m_c)$ to obtain the OCSK metric $$LL_{OCSR}(\tilde{x}) = -\frac{|y_1 - h_1\tilde{x}|^2}{N_{m_1}} - \frac{|y_2 - h_2\tilde{x}|^2}{N_{m_2}} \quad (12.3)$$

where $N_{m_1}$ and $N_{m_2}$ are the state-specific variances for channels 1 and 2. Note that $LL_{OCSK}(\tilde{x})$ has been simplified by removing certain terms that are common for all $\tilde{x}$.

For OCSU, the combining metric can be:

$$LL_{OCSC}(\tilde{x}) = \ln [p(y_1=h_1\tilde{x}) \cdot p(y_2=h_2\tilde{x})] \quad (12.4)$$

where $p(\cdot)$ is the pdf of a complex Middleton Class-A noise process. While its log-of-sum nature makes (12.4) difficult to simplify in exact form, an approximation can be found by calculating on the the first few terms of the expression.

Suboptimum Combining (SC)

A simple technique for suboptimum detection in impulsive noise is the "saturated average weighted Gaussian noise ("AWGN") metric" method [14]. This method can be applied to the PLC weighting in a wireless/PLC diversity system. This method can calculate the LL for the Gaussian state ($m_c=0$) and can compare it to a minimum threshold value. When applied to 2-branch diversity with Class A noise in both channels, the SC metric is $$LL_{SC}(\tilde{x}) = \max\{D_1(\tilde{x}), \delta_1\} + \max\{D_2(\tilde{x}), \delta_2\} \quad (12.5)$$

where $$D_c(\tilde{x}) = -|y_c - h_c\tilde{x}|^2 / N_{m_c}|_{m_c=0} \quad (12.6)$$

is the LL for the Gaussian component of the Class-A noise. In [14], it has been shown that a good rule-of-thumb for the threshold is $\delta_c = \ln(A_c^2 \Gamma_c)$.

Maximal Ratio Combining (MRC)

The MRC decision metric can be derived by replacing the Class-A pdf's in (1) with Gaussian pdf's which results in $$LL_{MRC}(\tilde{x}) = -\frac{|y_1 - h_1\tilde{x}|^2}{N_{1,tot}} - \frac{|y_2 - h_2\tilde{x}|^2}{N_{2,tot}} \quad (12.7)$$

Since $h_c$ and $N_{c,tot}$ can often be measured accurately, MRC is a practical combining method for many communication systems.

Combiner Output for BPSK

In some embodiments, the combiner output signal can be calculated for the case of binary phase-shift keying (BPSK) modulation. Because the wireless channel can be dominated by Gaussian receiver-thermal noise, maximal ratio combining can be used for the Wireless Weight. As presented above, 4 different combining schemes can be used to add the PLC channel component. The PLC Weight can be derived using one of the log-likelihood metrics described in the previous section.

For BPSK, the modulation alphabet is $\{-1,+1\}$ and the ML rule decides $\hat{x}=+1$ if LLR>0 where $\hat{x}$ denotes the decision value. The LLR is $LLR=LL(\tilde{x})|_{\tilde{x}=+1}-LL(\tilde{x})|_{\tilde{x}=-1}$ which has an analytical form that is dependent on the combining scheme used. The equations below show the combiner output for BPSK when each of the 4 combining schemes is used for the PLC channel.

$$y_{OCSR} = \frac{\Re[y_{RF} h_{RF}^*]}{N_{RF,tot}} + \frac{\Re[y_{PLC} h_{PLC}^*]}{N_{m_{PLC}}} \quad (12.8)$$

$$y_{OCSU} = \frac{\Re[y_{RF} h_{RF}^*]}{N_{RF,tot}} + \ln\left[\frac{p(y_{PLC} - h_{PLC})}{p(y_{PLC} + h_{PLC})}\right] \quad (12.9)$$

$$y_{SC} = \quad (12.10)$$
$$\frac{\Re[y_{RF} h_{RF}^*]}{N_{RF,tot}} + \max\{D_{PLC}(+1), \delta_{PLC}\} - \max\{D_{PLC}(-1), \delta_{PLC}\}$$

$$y_{MRC} = \frac{\Re[y_{RF} h_{RF}^*]}{N_{RF,tot}} + \frac{\Re[y_{PLC} h_{PLC}^*]}{N_{PLC,tot}} \quad (12.11)$$

In the equations above, $N_{m_{PLC}}$ is the state-specific variance for the PLC channel, and $$D_{PLC}(\tilde{x}) = -|y_{PLC} - h_{PLC}\tilde{x}|^2 / N_{PLC,0} \quad (12.12)$$

where $N_{PLC,0}$ is the variance of the Gaussian component of the PLC noise. The saturation threshold for SC combining is given by $\delta_{PLC} = \ln(A_{PLC}^2 \Gamma_{PLC})$ where $A_{PLC}$ is the impulsive index of the PLC channel and $\Gamma_{PLC}$ is the ratio of Gaussian-to-impulsive noise in the PLC channel. The impulsive index is calculated by multiplying the average number of impulses in one second with the average duration of each impulse.

BPSK Transmission

For BPSK transmission, this section presents the LLR for OCSK, OCSU, SC and MRC, and closed form BER expressions for OCSK and MRC. Although similar forms for LLR and BER can be found in [17, 19, 25-27], presenting these expressions together allows for a more comprehensive comparison of the techniques. The LLR presented for SC also has not appeared in previous work.

Log-Likelihood Ratio

For BPSK, the modulation alphabet is $\{-1,+1\}$ and the ML rule decides $\hat{x}=+1$ if LLR>0 where $\hat{x}$ denotes the decision value. The LLR is $LLR=LL(\tilde{x})|_{\tilde{x}=-1}-LL(\tilde{x})|_{\tilde{x}=-1}$ which has an analytical form that is dependent on the combining scheme used.

The LLR's for different schemes are given in (12.13)-(12.16) where we have made use of the LL's derived above:

$$LLR_{OCSR} = \frac{\Re[y_1 h_1^*]}{N_{m_1}} + \frac{\Re[y_2 h_2^*]}{N_{m_2}} \quad (12.13)$$

$$LLR_{OCSU} = \ln\left[\frac{p(y_1 - h_1)}{p(y_1 + h_1)}\right] + \ln\left[\frac{p(y_2 - h_2)}{p(y_2 + h_2)}\right] \quad (12.14)$$

$$LLR_{SC} = \max\{D_1(+1), \delta_1\} + \max\{D_2(+1), \delta_2\} - \quad (12.15)$$
$$\max\{D_1(-1), \delta_1\} - \max\{D_2(-1), \delta_2\}$$

$$LLR_{MRC} = \frac{\Re[y_1 h_1^*]}{N_{1,tot}} + \frac{\Re[y_2 h_2^*]}{N_{2,tot}} \quad (12.16)$$

The expressions in (12.13)-(12.16) reveal how the various schemes differ in making symbol decisions. In all cases, the LLR can contain an additive contribution from each channel being combined that represents the level of bias that each channel has towards a +1 or −1 decision. Each combining scheme can be characterized by the properties of its per-channel contribution term and the LLR's can be easily extended to the multi-channel case by including additional contribution terms.

Figure 7:
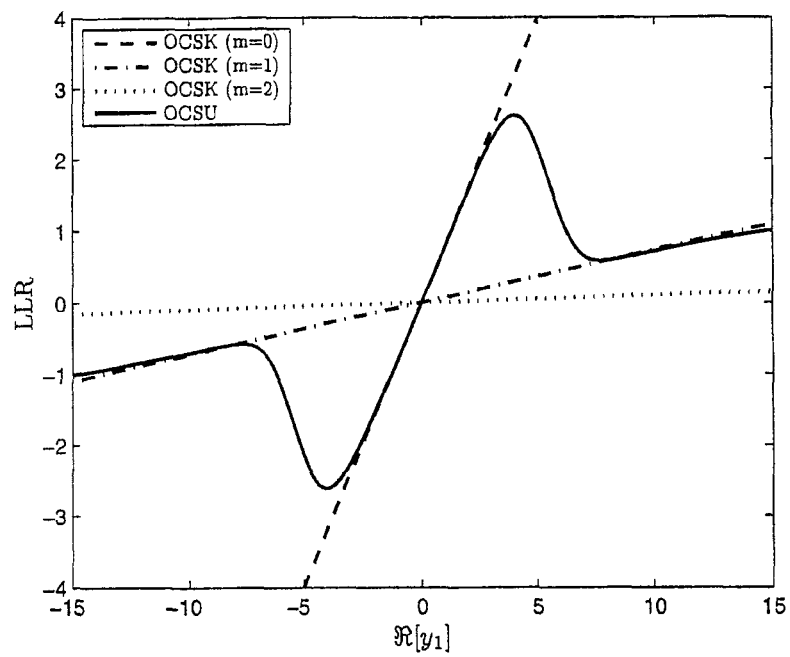
FIG. 7 is an X-Y chart depicting the log-likelihood ratio for optimum combining ($h_1=1$, $E[|y_1|]=1$, $\gamma_1=-10$ dB, $A_1=0.1$, $\Gamma_1=1$ and $y_2=0$).

To understand the nature of optimum combining, (12.13) and (12.14) are used in FIG. 7 to plot LLR versus $y_1$ for the case of $y_2=0$. By definition, Class-A noise is non-Gaussian so the non-linear form of the OCSU metric can be expected. However, FIG. 7 also shows that OCSK is a linear metric that is conditioned on Class-A state.

We now make some important observations regarding OCSU and OCSK that have yet to be noted in the literature. In FIG. 7, the OCSU LLR is shown to be approximately equal to the state-specific OSCK LLR's for certain regions of $y_1$. This is explained by recalling that each Class-A pdf in (12.14) can be a sum of Gaussian pdf's weighted by state probabilities. The product of the Gaussian pdf and state probability may be much larger for one state than others for select ranges of $y_1$. As a result, specific signal amplitudes may be highly correlated to specific Class-A states. This can result in the OCSU LLR being equivalent to the OCSK LLR for ranges of $y_1$ where there is a dominant state. It is, therefore, reasonable to expect OCSU and OCSK to have similar performance when dominant states exist for all expected ranges of $y_1$. This argument is supported by the information theoretic findings in [16] which show that systems with and without state knowledge may have equivalent performance depending on Class-A parameters.

FIG. 7 also shows that the OCSU LLR can have a larger magnitude for the Gaussian-dominated range ($|\Re[y_1]|<4$) than the impulse-dominated range ($|\Re[y_1]|>6$). This can indicate that the optimum LLR can contribute a higher level of certainty when the Class-A noise is in its AWGN state (ie. $m_c=0$).

Figure 8:
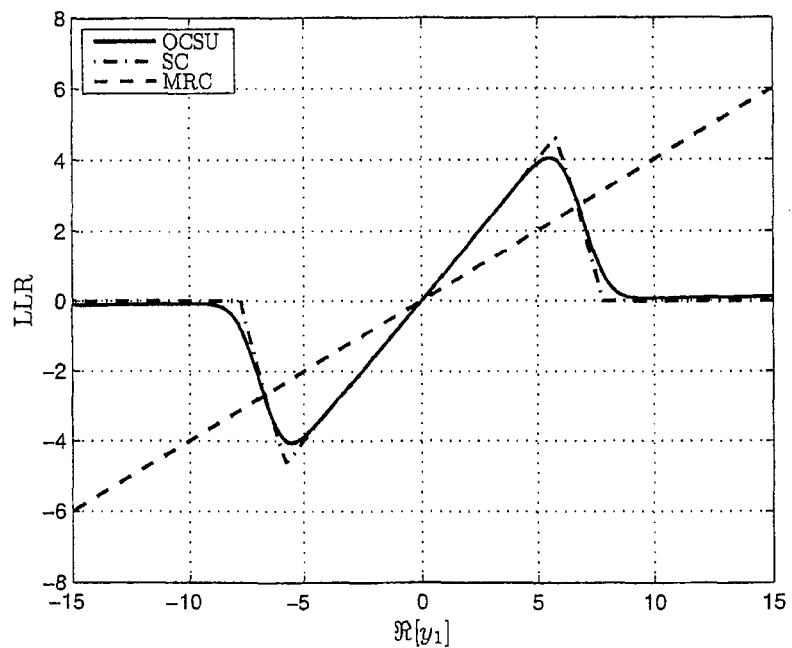
FIG. 8 is an X-Y chart depicting the log-likelihood ratio for practical combining and OCSU ($h_1=1$, $E[|y_1|]=1$, $\gamma_1=-10$ dB, $A_1=0.01$, $\Gamma_1=1$ and $y_2=0$).

The performance of suboptimum combining techniques can be directly related how closely they model the optimum LLR. In FIG. 8, the SC and MRC LLR's are compared to the OCSU LLR. While the agreement between SC and OSCU is excellent, the linear fit of the MRC metric is much less accurate. As a consequence, the per-channel contribution term for MRC exhibits too little confidence for small $y_1$ and excessive confidence for large $y_1$. This suggests that MRC BER can be considerably worse than for SC.

Closed-Form BER for OCSK and MRC

To determine BER expressions for OCSK and MRC, $z_1$ and $z_2$ can be viewed as independent noise processes that can occupy a random state every sample. A conditional BER, $P_{e|m_1,m_2}$, can be defined for a specific combination of Class-A states. The average BER can then be equal to the sum of $P_{e|m_1,m_2}$ multiplied by the joint probability of $m_1$ and $m_2$ for all possible state combinations:

$$P_e = \sum_{m_1=0}^{\infty} \sum_{m_2=0}^{\infty} \alpha_{m_1} \alpha_{m_2} P_{e|m_1,m_2}. \quad (12.17)$$

The linear nature of the LLR for OCSK and MRC can make it possible to determine a closed form for $P_e$. A key observation is that the additive terms in (12.13) and (12.16) are Gaussian random variables when conditioned on specific states for $m_1$ and $m_2$, which means:

$$P_{e|m_1,m_2} = Q\left(\frac{\sqrt{2}\, E[LLR|m_1,m_2]}{\sqrt{\text{Var}[LLR|m_1,m_2]}}\right) \quad (12.18)$$

where BPSK modulation is assumed and Var[·] denotes the variance operator. Substituting (12.13) or (12.16) into (12.18) and simplifying results in:

$$P_{e,OCSK|m_1,m_2} = Q\left(\sqrt{2\gamma_1/\beta_{m_1} + 2\gamma_2/\beta_{m_2}}\right) \quad (12.19)$$

$$P_{e,MRC|m_1,m_2} = Q\left(\frac{\sqrt{2}\,(\gamma_1+\gamma_2)}{\sqrt{\gamma_1\beta_{m_1} + \gamma_2\beta_{m_1}}}\right) \quad (12.20)$$

where $\beta_{m_c}$ and $\gamma_c$ are defined above. The closed-form BER can be obtained by substituting (12.19) or (12.20) in (12.17) and performing the summation.

Derivation of BER for MRC

In an actual realization of a system, the OFDM subcarriers can employ different types of $\Theta$-ary modulation in some embodiments. In a representative embodiment, the binary phase-shift keying ("BPSK") case can be analyzed to maintain clarity in the derivation and to gain an understanding of diversity performance.

The probability of symbol error for BPSK with Class A noise can be:

$$P_e = \sum_{m=0}^{\infty} \frac{e^{-A}A^m}{m!} Q\left(\frac{E\{y_r\}}{\sqrt{\sigma_{nr,m}^2}}\right) \quad (13)$$

where $E\{y_r\}$ is the expected value of $y_r$ given by:

$$E\{y_r\} = \left(\frac{|h_{RF}|^2}{N_{0,RF}} + \frac{|h_{PLC}|^2}{N_{0,PLC}}\right) x_r \quad (14)$$

and $$\sigma_{nr,m}^2 = \frac{m}{A}\sigma_{nrl}^2 + \sigma_{nrG}^2 \quad (15)$$

An alternative expression for BER can be obtained by substituting (14) and (15) into (13), multiplying the Q-function argument numerator and denominator by $x_r$, and using definitions for wireless and PLC channel SNRs, $$\gamma_{RF} = \frac{|h_{RF}|^2 x_r^2}{N_{0,RF}} \quad (16)$$

$$\gamma_{PLC} = \frac{|h_{PLC}|^2 x_r^2}{N_{0,PLC}}. \quad (17)$$

The resulting expression for instantaneous BER can be:

$$P_e(\gamma_{RF}) = \sum_{m=0}^{\infty} \frac{e^{-A}A^m}{m!} Q\left(\frac{\sqrt{2}\,(\gamma_{RF}+\gamma_{PLC})}{\sqrt{\gamma_{RF} + \gamma_{PLC}(\sigma_m^2/\sigma_{PLC}^2)}}\right) \quad (18)$$

where $\gamma_{PLC}$ can be assumed constant. Because the wireless channel can be modeled with Rayleigh fading, $\gamma_{RF}$ can have a Chi-squared distribution:

$$p(\gamma_{RF}) = \begin{cases} \frac{1}{\bar{\gamma}_{RF}} \exp\left(\frac{-\gamma_{RF}}{\bar{\gamma}_{RF}}\right), & 0 \le \gamma_{RF} < \infty \\ 0, & \gamma_{RF} < 0 \end{cases} \quad (19)$$

where $\bar{\gamma}_{RF}$ is the average SNR of the wireless channel.
The average BER can be calculated according to:

$$P_e = \int_0^\infty P_e(\gamma_{RF}) p(\gamma_{RF}) d\gamma_{RF} \quad (20)$$

By substituting (18) and (19) into (20), replacing Q with its integral definition, and changing the order of integration, we can obtain:

$$P_e = \sum_{m=0}^\infty \frac{e^{-A} A^m}{m!} Q\left(\sqrt{2\gamma'_{PLC}}\right) - \frac{1}{\sqrt{\pi}} \sum_{m=0}^\infty \frac{e^{-A} A^m}{m!} \int_{\sqrt{\gamma'_{PLC}}}^\infty a(t) dt \quad (21)$$

where $\gamma'_{PLC} = \gamma_{PLC}(\sigma_{PLC}^2/\sigma_m^2)$ and $$a(t) = \exp\left[\frac{-1}{\bar{\gamma}_{RF}} - \left[\frac{t^2}{2} - \gamma_{PLC} + \frac{t}{2}\sqrt{t^2 + 4\gamma_{PLC}\left(\frac{m/A - 1}{\Gamma_{PLC} + 1}\right)} - t^2\right]\right] \quad (22)$$

In some embodiments, numerical methods can be used to calculate the integral in (21) as a closed-form solution was not found.

In the special case when PLC is dominated by Gaussian noise ($\Gamma_{PLC} \to \infty$), (21) can simplifie to:

$$P_e = Q\left(\sqrt{2\gamma_{PLC}}\right) - \mu \exp\left(\gamma_{PLC}\left(\frac{1-\mu^2}{\mu^2}\right)\right) Q\left(\frac{\sqrt{2\gamma_{PLC}}}{\mu}\right) \quad (23)$$

where, by definition, $\mu = \sqrt{\bar{\gamma}_{RF}/(1+\bar{\gamma}_{RF})}$.

System Performance for MRC

In some embodiments, the performance of an uncoded BPSK subcarrier can be examined in a wireless/PLC diversity system. In some embodiments, BER can be viewed as a function of PLC and wireless SNR, respectively. In further embodiments, the properties of BER inflection points can be examined as a means to determine the transmission mode of the proposed architecture.

BER as a Function of $\gamma_{PLC}$

The architecture shown in FIG. 1 can allow the PLC channel to be used to improve the reliability of the wireless link. Therefore, one might ask: When does PLC diversity help? The BER in (21) can be calculated for cases of low and high wireless SNR and different levels of PLC impulsiveness, as shown in FIG. 4.

In some embodiments, the BER can be dominated by performance of the Rayleigh-faded wireless channel for low $\gamma_{PLC}$. At higher values of $\gamma_{PLC}$, the rolloff point of the BER curves can be highly dependent on the value of A. As shown in FIG. 4, the BER can become negligibly small for $\gamma_{PLC} > 15$ dB in Gaussian PLC channels, while the impulsive cases of A=0.1 and 0.01 require that $\gamma_{PLC}$ be better than 25 and 35 dB, respectively. This stems from the fact that BER can be dominated by PLC for large $\gamma_{PLC}$, and, in highly-impulsive PLC channels, bit-errors can be strongly correlated to the occurence of impulses. When $\Gamma_{PLC}$ is held constant, impulses can occur with 10 times larger signal energy in the A=0.01 case compared to the A=0.1 case. Therefore, it is reasonable to expect that $\gamma_{PLC}$ must be increased by roughly 10 times to maintain similar performance.

From a diversity perspective, FIG. 4 shows that system BER starts to improve for $\gamma_{PLC} > -10$ dB with a very significant improvement in the region of $\gamma_{PLC} > 10$ dB.

BER as a Function of $\bar{\gamma}_{RF}$

Figure 5:
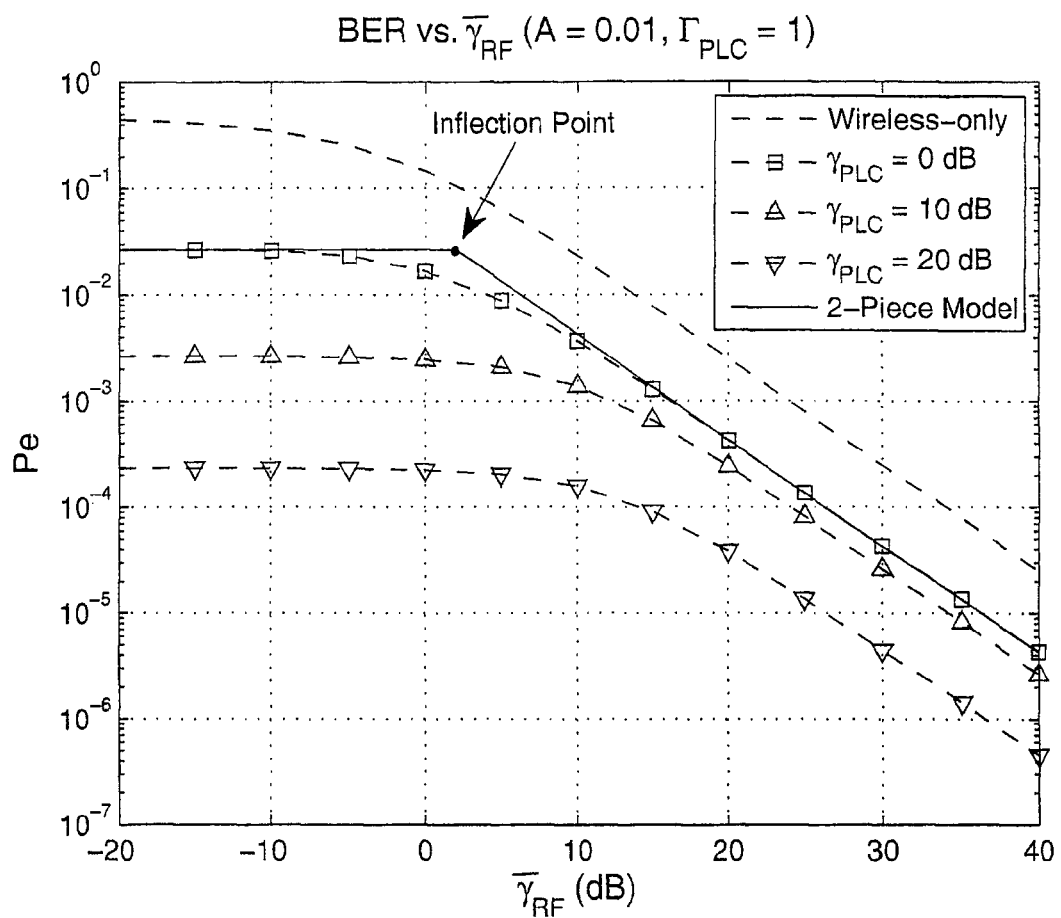
FIG. 5 is an X-Y chart depicting the bit error rate of a BPSK subcarrier versus the wireless network signal to noise ratio for MRC.

In some embodiments, variation of $\bar{\gamma}_{RF}$ can affect performance of the joint channel. Referring to FIG. 5, the BER can be plotted as a function of $\bar{\gamma}_{RF}$ for the wireless-only case ($\gamma_{PLC} = -\infty$) and $\gamma_{PLC}$'s of 0, 10, and 20 dB.

For simultaneous wireless/PLC transmission, there can exist two distinct regions in the BER curve. When wireless channel quality is poor (small $\bar{\gamma}_{RF}$), BER can be dominated by performance of the raw PLC channel which can be given by the first term in (21) and (23). For large $\bar{\gamma}_{RF}$, a slope of −1 can be clearly seen indicating that overall BER can improve in direct proportion to the BER improvement in the wireless channel when this channel is good ($\bar{\gamma}_{RF} < 10$ dB).

The case of wireless-only transmission represents an upper-bound and can be equivalent to BER of a single Rayleigh-faded channel. From the plot, we can conclude that PLC diversity offers BER improvement regardless of the quality of the wireless channel. This improvement is at least an order of magnitude when $\gamma_{PLC} > 10$ dB.

BER Inflection Points

Referring to FIG. 5, it is clear that the BER curves can be represented using linear equations in the regions of low and high $\bar{\gamma}_{RF}$. Of particular interest is the value of $\bar{\gamma}_{RF}$ where the BER can transition from a slope of 0 to a slope of −1, which can be reminiscent of 3 dB break frequencies in Bode frequency response plots. This can be the point where the wireless link starts to offer an improvement over PLC-only transmission.

It is important to remember that both the wireless and PLC links can be multiple access channels. For most WiFi scenarios, access to both channels can be managed using some form of contention-based access scheme, as well known to those skilled in the art. Therefore, it is important to ensure that the architecture in FIG. 1 only transmits on both channels when a performance gain can be achieved.

Figure 6:
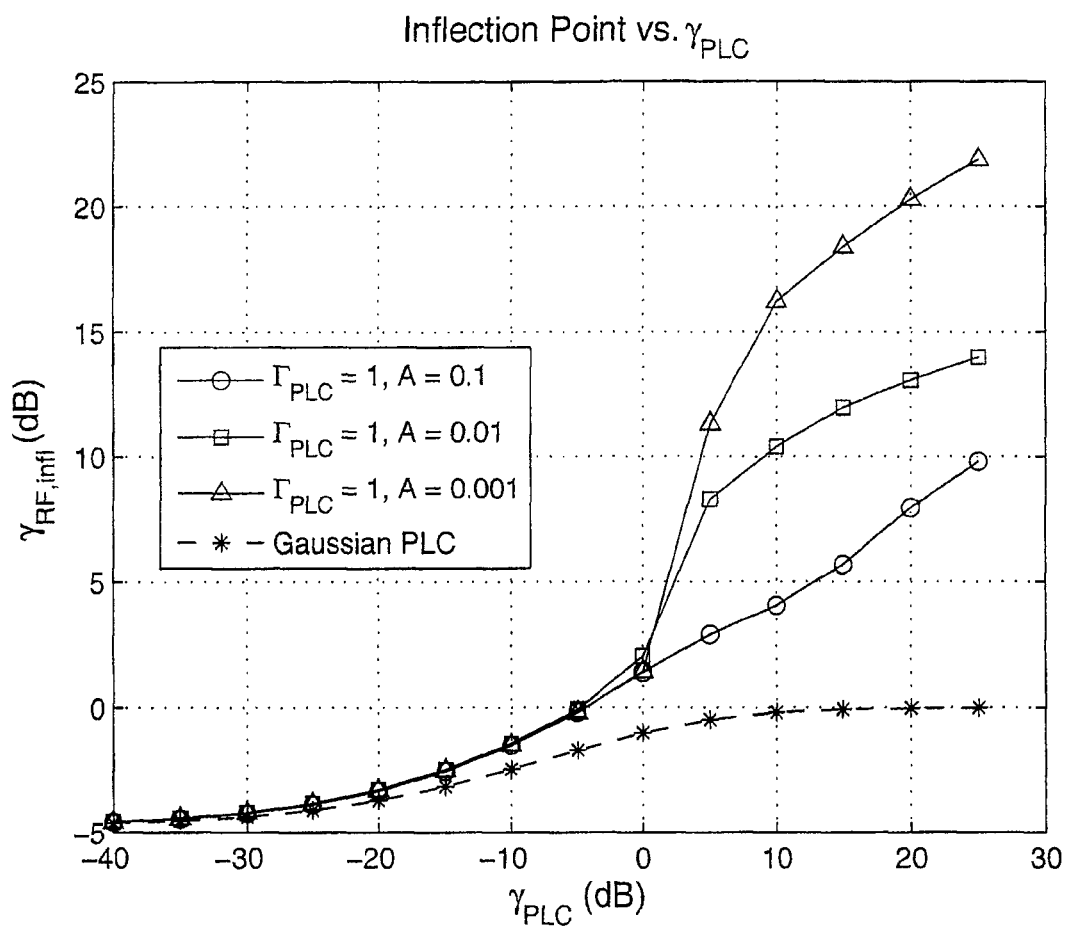
FIG. 6 is an X-Y chart depicting bit error rate inflection points.

The point at which simultaneous wireless/PLC transmission has a benefit can occur when $\bar{\gamma}_{RF}$ passes the BER inflection point. To better understand where this occurs, the inflection location can be calculated for a range of $\gamma_{PLC}$. For each calculation, numerical methods cn be used to solve for the value of $\bar{\gamma}_{RF}$ in (21) which results in $P_e$ being ½ of its maximum value (given by the first term). FIG. 6 shows the inflection point locations for the Gaussian only channel and a range of A.

Note that, in some embodiments, the inflection point values can form a curve for a particular value of impulsive index. The regions below each curve can represent operating points where hybrid transmission offers negligible improvement over PLC-only transmission. Therefore, a system could be designed to adaptively switch transmission modes based on the measured SNR on the wireless and PLC links. For example, the system would enable hybrid mode only when $\bar{\gamma}_{RF}$ is above 0 dB and PLC noise is Gaussian, or when $\bar{\gamma}_{RF}$ is above 15 dB when PLC noise is moderately impulsive (A=0.01).

Simulation Results for OCSK, OCSU, SC, AND MRC

The following presents BER results for a 2-branch diversity system with impulsive noise in one diversity path and AWGN in the other. This scenario can arise for a wireless/PLC diversity system [21]. This system can be used to counter the destructive multipath fading that can occur on both the wireless and PLC channels. If the symbol period is much longer than the delay spread of both channels or if there is sufficient guard time in an OFDM subcarrier, then intersymbol interference can be assumed negligible and (5.1) can be used represent the signals at the receiver. To reflect this scenario, the channel indices can be transformed such that $c \in \{1, 2\} \rightarrow c \in \{w,p\}$, where w is the AWGN wireless channel and p is the Class-A PLC channel. The AWGN channel can be modeled by setting $\Gamma_w = \infty$ in the relevant formulas. In the following, BER results are presented for uncoded BPSK as well as BPSK with low-density parity-check (LDPC) coding.

Performance without Channel Coding

Figure 9:
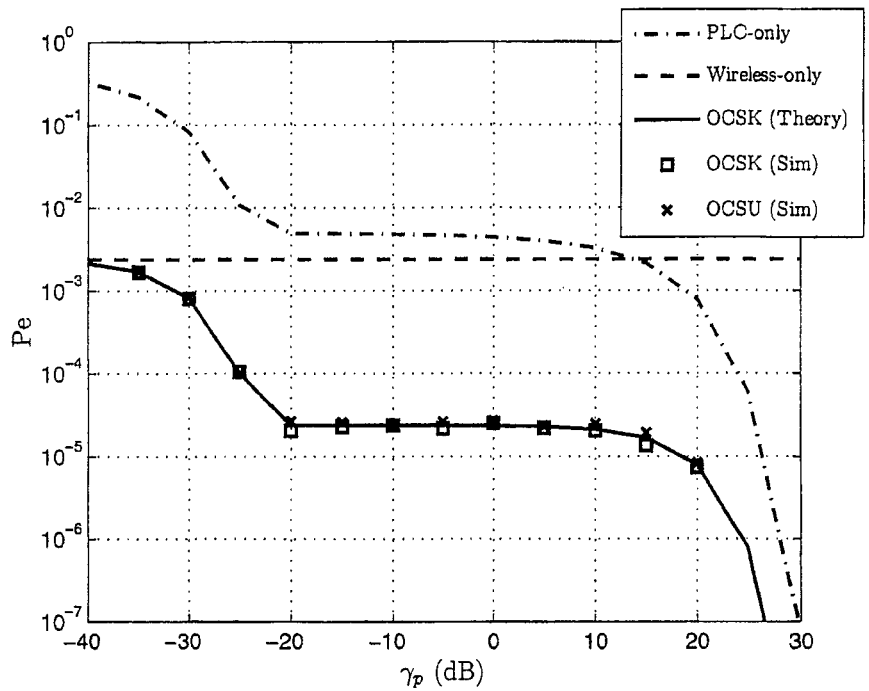
FIG. 9 is an X-Y chart depicting the BER for 2-channel BPSK and optimum combining ($\gamma_w=6$ dB, $A_p=0.01$ and $\Gamma_p=0.001$).

The wireless/PLC system BER for the case of optimum combining is plotted in FIG. 9. In this figure, the BER has been plotted as a function of PLC SNR, $\gamma_p$. To represent a typical indoor scenario, a wireless SNR of 6 dB was used and the Class-A parameters were set to $A_p=0.01$ and $\Gamma_p=0.001$ for PLC noise [15]. The theoretical BER for OCSK was calculated using (12.17) and (12.19) and simulated results were obtained using the LLR's in (12.13) and (12.14). The error rates for the individual wireless and PLC channels are also plotted for comparison.

As FIG. 9 shows, significant BER improvement is possible when independent wireless and PLC channels are combined in an optimum manner. When $\gamma_p$ is low, system performance is equivalent to the wireless channel. However, as $\gamma_p$ increases, the improvement in system BER is equivalent to the improvement observed in a PLC-only channel. The 2 orders-of-magnitude improvement in BER for OCSK and OCSU is nearly identical to the improvement observed in the PLC-only channel for the same conditions.

Figure 10:
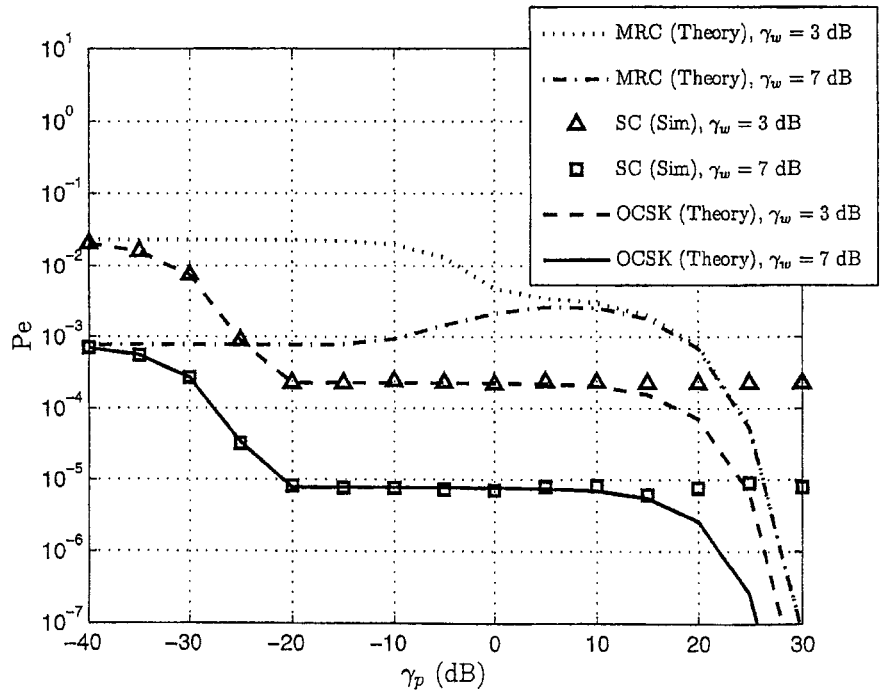
FIG. 10 is an X-Y chart depicting the BER for practical combining ($A_p=0.01$ and $\Gamma_p=0.001$).

The performance of a wireless/PLC system that employs practical combining schemes is shown in FIG. 10. In this figure, the BER for MRC and SC is plotted as a function of PLC SNR for wireless SNR's of 3 and 7 dB. The theoretical BER for MRC was calculated using (12.17) and (12.20) and simulated results for SC were obtained using the LLR in (12.15).

As FIG. 10 shows, MRC is unable to achieve optimum performance for moderate values of PLC SNR. The difference between the MRC and OCSK curves for $-20$ dB$<\gamma_p<20$ dB is due to erroneous LLR contributions from the Class-A channel in the MRC system. As discussed above, the MRC LLR can represent a non-ideal fit to the optimum LLR. This causes the additive term for the Class-A channel to contribute to little or too much confidence to the final LLR decision depending on the signal amplitude.

FIG. 10 shows that SC combining achieves near-optimum performance for a wide range of PLC SNR's. The BER for SC is approximately the same as OCSK for the range $-40$ dB$<\gamma_p<10$ dB. As $\gamma_p$ increases beyond 10 dB, the SC BER remains finite due to occasional saturation of the log-likelihood metric. The AWGN metric in (12.6) can be viewed as the distance between the received sample and trial value which is normalized to Gaussian power in the Class-A channel. An impulse with larger-than-AWGN amplitude results in the metric saturating and providing a null decision. This results in near-optimum decisions when both channels have moderate SNR. However, saturation also occurs at high SNR's which results in a finite error-rate.

Performance with LDPC Coding

Figure 11:
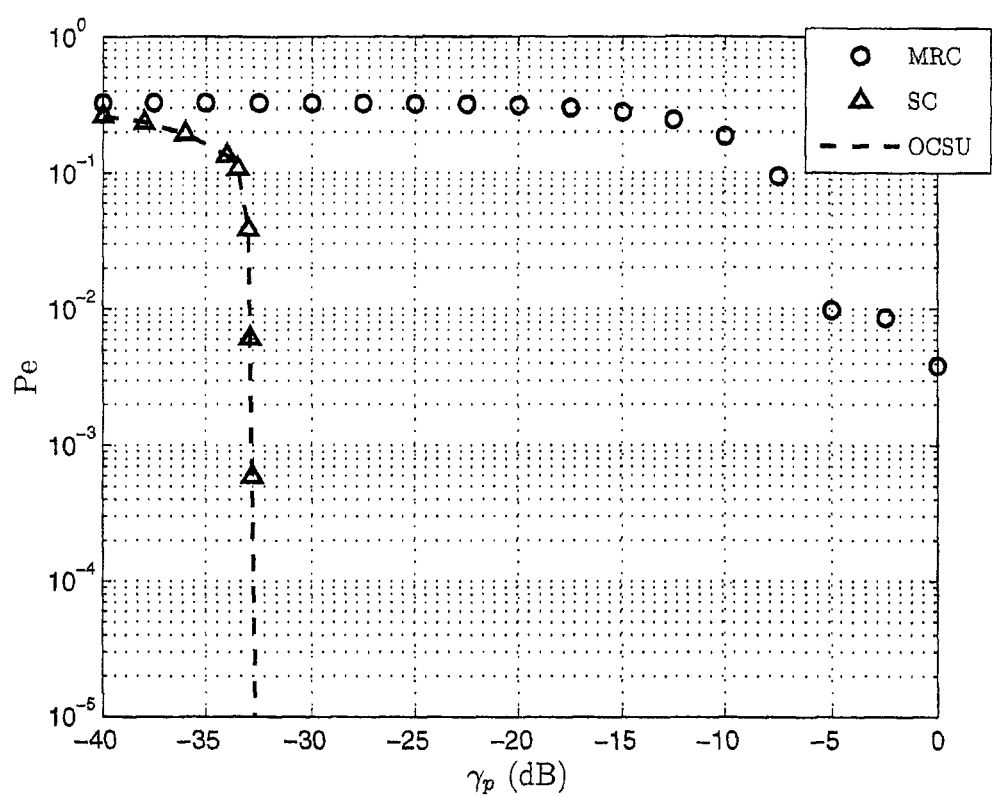
FIG. 11 is an X-Y chart depicting the simulated performance with 30-iteration LDPC coding (½ rate, 32400 info bits, $\gamma_w=-10$ dB, $A_p=0.01$ and $\Gamma_p=0.001$).

In this section, the performance of optimum and suboptimum combining is examined when an LDPC code is applied. An irregular code with half-rate (R=½) and 32400 information bits was used from the Digital Video Broadcasting standard [29]. The LLR's in (12.14)-(12.16) were used to perform 30 decoding iterations using the sum-product algorithm for OCSU, SC and MRC. The BER was calculated as a function of PLC SNR for $\gamma_w = -10$ dB and is shown in FIG. 11.

The BER curves demonstrate that SC combining can achieve near-optimum performance while MRC results in considerably higher error-rates. These results corroborate findings from single-channel studies which have shown that the conventional, Gaussian-based metrics perform poorly and saturated AWGN metrics perform near-optimum in LDPC-coded systems [16,23]. OCSU and SC can achieve negligible error-rates at low PLC SNR's because the impulsive noise is much larger than AWGN in this case ($\Gamma_p=0.001$). As LDPC codes can be effective against the impulsive component of Class-A noise [23], error-free performance can be achieved at a low SNR.

In summary, optimum and suboptimum methods for combining two independent Class-A channels have been presented. In some embodiments, decision metrics can be been derived for the case of BPSK modulation and can be easily extended to the case of L-branch diversity. The optimum LLR can be a nonlinear function for Class-A noise which can be closely modeled by SC but not MRC. Calculation and simulation of BPSK BER show that SC can achieve near-optimum performance for uncoded and coded cases while MRC is degraded by several orders of magnitude.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

REFERENCES

The following documents are hereby incorporated into this application by reference in their entirety.

[1] Brennan, D. G. Linear Diversity Combining Techniques. *Proceedings of the IRE*, 47(6):1075-1102, 1959.

[2] Canete, F. J. and Cortes, J. A. and Diez, L. and Entrambasaguas, J. T. and Carmona, J. L. Fundamentals of the cyclic short-time variation of indoor power-line channels. *IEEE International Symposium on Power Line Communication and its Applications*, pages 157-161, 2005.

[3] Chan, Morgan H. L. and Donaldson, Robert W. Attenuation of Communication Signals on Residential and Commercial Intrabuilding Power-Distribution Circuits. *IEEE Transactions on Electromagnetic Compatibility*, 28(4):220-230, 1986.

[4] Corripio, F. J. C. and Arrabal, J. A. C. and del Rio, L. D. and Munoz, J. T. E. Analysis of the cyclic short-term variation of indoor power line channels. *IEEE Journal on Selected Areas of Communication*, 24(7):1327-1338, 2006.

[5] Giovaneli, C. L. and Honary, B. and Farrell, P. G. Optimum Space-Diversity Receiver for Class A Noise Channels. *IEEE International Symposium on Power Line Communication and its Applications*, pages 189-194, 2004.

[6] Gotz, M. and Rapp, M. and Dostert, K. Power line channel characteristics and their effect on communication system design. *IEEE Communications Magazine*, 42(4):78-86, 2004.

[7] Häring, J. and Vinck, A. J. H. Coding for Impulsive Noise Channels. *IEEE International Symposium on Power Line Communication and its Applications*, 2001.

[8] Er Liu and Yangpo Gao and Samdani, G. and Mukhtar, O. and Korhonen, T. Broadband powerline channel and capacity analysis. *IEEE International Symposium on Power Line Communication and its Applications*, pages 7-11, 2005.

[9] Middleton, D. Non-Gaussian noise models in signal processing for telecommunications: New methods an results for Class A and Class B noise models. *IEEE Transactions on Information Theory*, 45(4):1129-1149, 1999.

[10] Middleton, D. Statistical-Physical Models of Electromagnetic Interference. *IEEE Transactions on Electromagnetic Compatibility*, EMC-19(3):106-127, 1977.

[11] S. Katar, M. Krishnam, R. Newman, and H. Latchman. Harnessing the potential of powerline communications using the HomePlug AV standard. *RF Design*, 2006.

[12] Zimmermann, M. and Dostert, K. A multipath model for the powerline channel. *IEEE Transactions on Communications*, 50(4):553-559, 2002.

[13] Zimmermann, M. and Dostert, K. Analysis and modeling of impulsive noise in broad-band powerline communications. *IEEE Transactions on Electromagnetic Compatibility*, 44(1):249-258, 2002.

[14] Fertonani, D. and Colavolpe, G. A robust metric for soft-output detection in the presence of class-A noise. *IEEE Transactions on Communications*, 57(1):36-40, 2009.

[15] Andreadou, N. and Pavlidou, F.-N. Modeling the Noise on the OFDM Power-Line Communications System. *IEEE_J_PWRD*, 25(1):150-157, 2010.

[16] Fertonani, D. and Colavolpe, G. A robust metric for soft-output detection in the presence of class-A noise. *IEEE_J_COM*, 57(1):36-40, 2009.

[17] Häring, R. and Han Vinck, A. J. Performance bounds for optimum and suboptimum reception under Class-A impulsive noise. *IEEE_J_COM*, 50(7):1130-1136, 2002.

[18] Hashmat, R. and Pagani, P. and Zeddam, A. and Chonavel, T. MIMO communications for inhome PLC networks: Measurements and results up to 100 MHz. *IEEE_C_ISPLC*, pages 120-124, 2010.

[19] Hollemans, W. and Prasad, R. and Kegel, A. Performance analysis of cellular digital mobile radio systems including diversity techniques. *The 8th IEEE International Symposium on Personal, Indoor and Mobile Radio Communications*, 1997, pages 266-270 vol. 2, 1997.

[20] Kay, S. M. *Fundamentals of Statistical Signal Processing: Detection Theory*. Prentice Hall, 1998.

[21] Lai, S. W. and Messier, G. G. The Wireless/Power-line Diversity Channel. *IEEE_C_ICC*, 2010.

[22] Middleton, D. Statistical-Physical Models of Electromagnetic Interference. *IEEE_J_EMC*, EMC-19(3):106-127, 1977.

[23] Nakagawa, H. and Umehara, D. and Denno, S. and Morihiro, Y. A decoding for low density parity check codes over impulsive noise channels. *IEEE_C_ISPLC*, pages 85-89, 2005.

[24] Proakis, J. G. *Digital Communications*. McGraw Hill, 4 edition, 2001.

[25] Schober, R. and Ma, Y. and Lampe, L. and Mathiopoulos, P. T. Diversity combining for coherent and differential M-PSK in fading and class-A impulsive noise. *IEEE_J_WCOM*, 4(4):1425-1432, 2005.

[26] Spaulding, A. and Middleton, D. Optimum Reception in an Impulsive Interference Environment—Part I: Coherent Detection. *IEEE_J_COM*, 25(9):910-923, 1977.

[27] Tepedelenlioglu, C. and Ping Gao. On diversity reception over fading channels with impulsive noise. *IEEE_J_VT*, 54(6):2037-2047, 2005.

[28] Zimmermann, M. and Dostert, K. Analysis and modeling of impulsive noise in broad-band powerline communications. *IEEE_J_EMC*, 44(1):249-258, 2002.

[29] Second generation Digital Video Broadcasting standard (DVB-S2). *ETSI EN 302 307 V1.2.1*, 2008.

We claim:

1. A system for providing a diversity communications channel to a wireless communications network, comprising:
  a) an input data modulator for receiving a data input signal and transforming the input signal to at least one input data stream;
  b) at least one digital to analogue converter ("DAC") operatively coupled to the input data modulator, wherein the at least one DAC is configured to convert the at least one input data stream into at least one analogue signal;
  c) a radio frequency ("RF") upconverter operatively coupled to the at least one DAC, wherein the RF upconverter is configured to modulate an RF carrier signal with the at least one analogue signal;
  d) an intermediate frequency ("IF") modulator operatively coupled to the at least one DAC, wherein the IF modulator is configured to modulate an IF carrier signal with the at least one analogue signal;
  e) a wireless RF communications receiver for wirelessly receiving the modulated RF carrier signal;
  f) an RF downconverter operatively coupled to the wireless RF receiver, wherein the RF downconverter is configured to demodulate the at least one analogue signal from the received modulated RF carrier signal;
  g) at least one analogue to digital converter ("ADC") operatively coupled to the RF downconverter, wherein the at least one ADC is configured to convert the at least one analogue signal into at least one output data stream;
  h) a first data demodulator operatively coupled to the at least one ADC, wherein the first data demodulator is configured to transform the at least one output data stream into a first digital data output signal;
  i) an IF demodulator operatively coupled to a power-line communications channel, wherein the IF demodulator is configured to demodulate the at least one analogue signal from the modulated IF carrier signal;
  j) a second ADC operatively coupled to the IF demodulator, wherein the second ADC is configured to convert the at least one analogue signal into a second output data stream; and
  k) a second data demodulator operatively coupled to the second ADC, wherein the second data demodulator is configured to transform the second output data stream into a second digital data output signal.

2. The system as set forth in claim 1, further comprising means for wirelessly transmitting the modulated RF carrier signal over a wireless communications channel disposed on the wireless communications network.

3. The system as set forth in claim 1, further comprising means for transmitting the modulated IF carrier signal over the power-line communications channel.

4. The system as set forth in claim 1, further comprising a diversity combiner operatively coupled to the first and second data demodulators, wherein the diversity combiner is configured for combining the first and second digital data output signals.

5. The system as set forth in claim 4, further comprising a maximum likelihood detector operatively coupled to the diversity combiner, wherein the maximum likelihood detector is configured to produce an output data signal from the combined first and second digital data output signals.

6. A method for providing a diversity communications channel to a wireless communications network, the method comprising:
 a) transforming a data input signal into at least one input data stream;
 b) converting the at least one input data stream into at least one analogue signal;
 c) modulating the at least one analogue signal onto a radio frequency ("RF") carrier signal;
 d) modulating the at least one analogue signal onto an intermediate frequency ("IF") carrier signal;
 e) wirelessly receiving the transmitted modulated RF carrier signal;
 f) demodulating the at least one analogue signal from the received modulated RF carrier signal;
 g) converting the at least one analogue signal into at least one output data stream;
 h) transforming the at least one output data stream into a first digital data output signal;
 i) demodulating the at least one analogue signal from the modulated IF carrier signal;
 j) converting the at least one analogue signal into a second output data stream; and
 k) transforming the second output data stream into a second digital data output signal.

7. The method as set forth in claim 6, further comprising wirelessly transmitting the modulated RF carrier signal over a wireless communications channel disposed on the wireless communications network.

8. The method as set forth in claim 6, further comprising transmitting the modulated IF carrier signal over a power-line communications channel.

9. The method as set forth in claim 6, further comprising combining the first and second digital data output signals, and producing an output data signal from the combined first and second digital data output signals.

10. A computing device configured for transmitting data over a wireless communications network, the computing device comprising a system for providing a diversity communications channel over the wireless communications network, the system comprising:
 a) an input data modulator for receiving a data input signal and transforming the input signal to at least one input data stream;
 b) at least one digital to analogue converter ("DAC") operatively coupled to the input data modulator, wherein the at least one DAC is configured to convert the at least one input data stream into at least one analogue signal;
 c) a radio frequency ("RF") upconverter operatively coupled to the at least one DAC, wherein the RF upconverter is configured to modulate an RF carrier signal with the at least one analogue signal;
 d) an intermediate frequency ("IF") modulator operatively coupled to the at least one DAC, wherein the IF modulator is configured to modulate an IF carrier signal with the at least one analogue signal;
 e) a wireless RF communications receiver for wirelessly receiving the transmitted modulated RF carrier signal;
 f) an RF downconverter operatively coupled to the wireless RF receiver, wherein the RF downconverter is configured to demodulate the at least one analogue signal from the received modulated RF carrier signal;
 g) at least one analogue to digital converter ("ADC") operatively coupled to the RF downconverter, wherein the at least one ADC is configured to convert the at least one analogue signal into at least one output data stream;
 h) a first data demodulator operatively coupled to the at least one ADC, wherein the first data demodulator is configured to transform the at least one output data stream into a first digital data output signal;
 i) an IF demodulator operatively coupled to the power-line communications channel, wherein the IF demodulator is configured to demodulate the at least one analogue signal from the modulated IF carrier signal;
 j) a second ADC operatively coupled to the IF demodulator, wherein the second ADC is configured to convert the at least one analogue signal into a second output data stream; and
 k) a second data demodulator operatively coupled to the second ADC, wherein the second data demodulator is configured to transform the second output data stream into a second digital data output signal.

11. The computing device as set forth in claim 10, wherein the system further comprises means for wirelessly transmitting the modulated RF carrier signal over a wireless communications channel disposed on the wireless communications network.

12. The computing device as set forth in claim 10, wherein the system further comprises means for transmitting the modulated IF carrier signal over a power-line communications channel.

13. The computing device as set forth in claim 10, wherein the system further comprises a diversity combiner operatively coupled to the first and second data demodulators, wherein the diversity combiner is configured for combining the first and second digital data output signals.

14. The computing device as set forth in claim 13, wherein the system further comprises a maximum likelihood detector operatively coupled to the diversity combiner, wherein the maximum likelihood detector is configured to produce an output data signal from the combined first and second digital data output signals.

15. The computing device as set forth in claim 10, wherein the computing device comprises one or more of the group consisting of personal computers, laptop computers, notebook computers, computer servers, computer routers, computer, modems, digital television set-top boxes, personal digital assistants, wireless telephones, cellular telephones and smart phones.

* * * * *

UNITED STATES PATENT AND TRADEMARK OFFICE
CERTIFICATE OF CORRECTION

PATENT NO. : 8,861,574 B2
APPLICATION NO. : 13/698120
DATED : October 14, 2014
INVENTOR(S) : Stephen William Lai et al.

It is certified that error appears in the above-identified patent and that said Letters Patent is hereby corrected as shown below:

In the Specification

Column 1, line 14, change "the" to --their--;
Column 5, equation (2), the portion of that equation reading "$h_{PLC}$" should read --$h_{PLC}x$--;
Column 6, line 43, change the " $\sigma_G^2 + \sigma_I^2$ " to -- $\sigma_G^2 + \sigma_I^2$ -- and change the " $\sigma_G^2/\sigma_I^2$ " to -- $\sigma_G^2/\sigma_I^2$ --;
Column 6, line 44, change the " $\sigma_I^2$ " to -- $\sigma_I^2$ --;
Column 8, line 26, change "≈" to -- = --;
Column 8, line 27, change the " $2\sigma_I^2$ " to -- $2\sigma_I^2$ --;
Column 8, line 38, change the " $\sigma_{m\prime I}^2$ " to -- $\sigma_{m\prime I}^2$ --;
Column 8, equation (12.1), reading " $LL(\tilde{x})\ln[p(y_1|\tilde{x}) \cdot p(y_2|\tilde{x})]$ " should read
-- $LL(\tilde{x}) = \ln[p(y_1|\tilde{x}) \cdot p(y_2|\tilde{x})]$ --;
Column 9, equation (12.4), the portion of that equation reading " $p(y_1 = h_1\tilde{x})$ " should read --
$p(y_1 - h_1\tilde{x})$ --;
Column 10, line 3, change " $-LL(\tilde{x})|_{\tilde{x}=-1}$ " to -- $-LL(\tilde{x})|_{\tilde{x}=-1}$ --; and
Column 13, line 36, change "∝" to --∞--.

Signed and Sealed this
Twenty-first Day of July, 2015

Michelle K. Lee
*Director of the United States Patent and Trademark Office*